(12) United States Patent
Bischoff

(10) Patent No.: US 10,058,029 B2
(45) Date of Patent: Aug. 28, 2018

(54) VIBRATION SENSOR UNIT

(71) Applicant: Deere & Company, Moline, IL (US)

(72) Inventor: Lutz Bischoff, Nuenschweiler (DE)

(73) Assignee: Deere & Company, Moline, IL (US)

( * ) Notice: Subject to any disclaimer, the term of this patent is extended or adjusted under 35 U.S.C. 154(b) by 779 days.

(21) Appl. No.: 14/163,385

(22) Filed: Jan. 24, 2014

(65) Prior Publication Data

US 2014/0208851 A1   Jul. 31, 2014

(30) Foreign Application Priority Data

Jan. 31, 2013 (DE) .................. 10 2013 201 618

(51) Int. Cl.
*G01N 29/12* (2006.01)
*A01D 41/127* (2006.01)

(52) U.S. Cl.
CPC ....... *A01D 41/1273* (2013.01); *A01D 41/127* (2013.01)

(58) Field of Classification Search
CPC .............. A01D 41/1273; A01D 41/127; A01D 41/1271; A01D 75/187; A01D 75/18; A01F 29/095; A01F 29/16
See application file for complete search history.

(56) References Cited

U.S. PATENT DOCUMENTS

| | | | | |
|---|---|---|---|---|
| 3,939,846 A * | 2/1976 | Drozhzhin | ........... | A01D 41/127 460/1 |
| 4,000,398 A * | 12/1976 | Conner | ............... | G06F 7/62 377/24 |
| 4,393,704 A * | 7/1983 | Bartko | ............... | A01D 41/1273 221/96 |
| 5,488,817 A * | 2/1996 | Paquet | ............... | A01D 41/127 56/10.2 R |
| 5,775,072 A * | 7/1998 | Herlitzius | ............. | A01D 41/1276 460/4 |
| 6,125,702 A * | 10/2000 | Kuchar | ............... | A01D 41/1271 56/10.2 R |
| 6,146,268 A * | 11/2000 | Behnke | ............... | A01D 41/1273 460/4 |
| 6,442,916 B1 * | 9/2002 | Pope | ............... | A01D 41/1271 56/10.2 R |
| 6,778,894 B2 * | 8/2004 | Beck | ............... | A01D 41/127 701/33.7 |

(Continued)

FOREIGN PATENT DOCUMENTS

| DE | 10100522 A1 | 7/2002 |
|---|---|---|
| DE | 10 2009 000351 | * 7/2010 |

(Continued)

OTHER PUBLICATIONS

European Search Report dated May 23, 2014 (6 pages).

*Primary Examiner* — Helen Kwok
(74) *Attorney, Agent, or Firm* — Rathe Lindenbaum LLP

(57) ABSTRACT

A vibration sensor unit (66) is provided with a vibration sensor (72) and with an electronic signal processing circuit (82) which derives from the signals of the vibration sensor (72) information regarding a quantity of lost grain detected by the vibration sensor (72). The electronic signal processing circuit (82) also examines the signals of the vibration sensor (72) for vibrations that may be signs of potential damage to moving parts.

20 Claims, 2 Drawing Sheets

(56) References Cited

U.S. PATENT DOCUMENTS

| | | | | |
|---|---|---|---|---|
| 7,231,303 | B2* | 6/2007 | Griessler | G01M 13/045 |
| | | | | 702/182 |
| 7,316,104 | B2* | 1/2008 | Melano | A01D 45/22 |
| | | | | 56/119 |
| 7,584,663 | B2* | 9/2009 | Missotten | A01D 41/1273 |
| | | | | 209/599 |
| 9,668,421 | B2* | 6/2017 | Depestel | A01D 75/18 |
| 2002/0091476 | A1* | 7/2002 | Beck | A01D 41/1271 |
| | | | | 701/50 |
| 2002/0107624 | A1* | 8/2002 | Rutz | A01B 63/00 |
| | | | | 701/50 |
| 2002/0116107 | A1* | 8/2002 | Mahoney | A01B 63/00 |
| | | | | 701/50 |
| 2003/0066277 | A1* | 4/2003 | Behnke | A01D 41/127 |
| | | | | 56/10.2 R |
| 2005/0026662 | A1* | 2/2005 | Fechner | A01D 41/1271 |
| | | | | 460/1 |
| 2006/0276949 | A1* | 12/2006 | Beck | A01D 41/127 |
| | | | | 701/50 |
| 2006/0277882 | A1* | 12/2006 | Berger | A01D 75/187 |
| | | | | 56/10.2 J |
| 2007/0233416 | A1* | 10/2007 | Jeppe | A01D 41/1273 |
| | | | | 702/127 |
| 2009/0299564 | A1* | 12/2009 | Sheidler | A01D 69/02 |
| | | | | 701/31.4 |
| 2014/0135082 | A1* | 5/2014 | Batcheller | A01D 41/1273 |
| | | | | 460/5 |
| 2016/0235003 | A1* | 8/2016 | Baumgarten | A01D 41/1273 |
| 2017/0000032 | A1* | 1/2017 | Missotten | A01F 12/38 |

FOREIGN PATENT DOCUMENTS

| | | | |
|---|---|---|---|
| DE | 102009000351 | A1 | 7/2010 |
| DE | 102011007843 | A1 | 10/2012 |
| EP | 1839478 | A1 | 10/2007 |
| EP | 2514299 | * | 10/2012 |

* cited by examiner

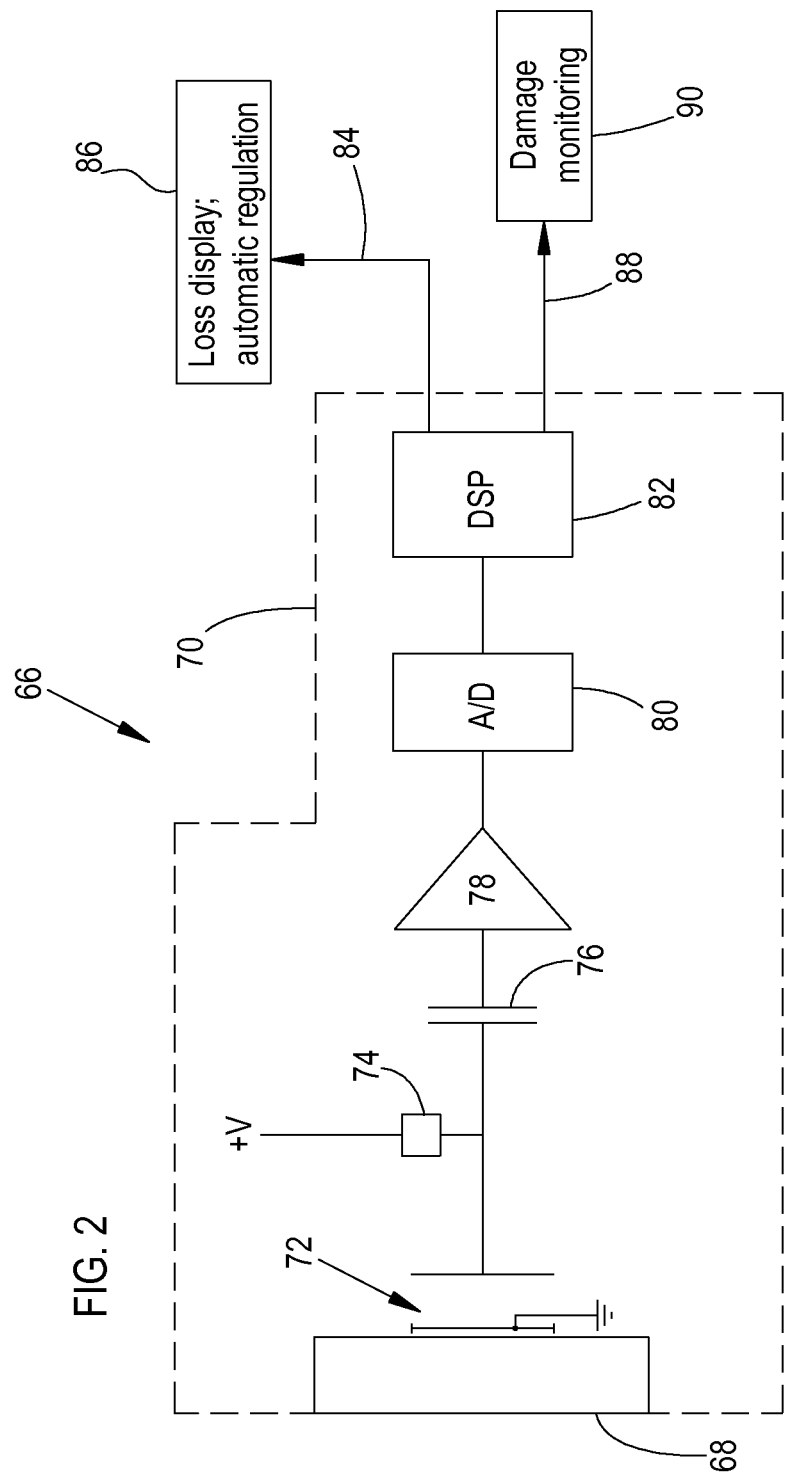

VIBRATION SENSOR UNIT

FIELD OF THE INVENTION

The invention pertains to a vibration sensor unit with a vibration sensor and an electronic signal processing circuit connected in a signal transmitting manner to the vibration sensor, and configured to derive from the signals of the vibration sensor information pertaining to the quantity of lost grains detected by the vibration sensor, and to deliver said quantity as an initial value for further processing and/or display.

BACKGROUND OF THE INVENTION

Agricultural combine harvesters are used in the harvest of cereal crops, in order to harvest and thresh plants grown in a field. The threshed harvest material is subsequently processed further by a separation device. The grain obtained in the threshing and separation process is subsequently cleaned in a cleaning device and deposited in a grain tank, from which it is then finally transferred to a transport vehicle. In order to set optimally operating parameters of the threshing and separation device or of the cleaning device and/or for the predetermination of the speed of advance of the combine harvester, which determines the throughput, one uses so-called lost grain sensors that comprise impact plates with vibration sensors, which are arranged at the outlet of the respective device. Grains that impinge on the impact plate generate vibrations that are detected by the vibration sensors and evaluated by an evaluation circuit. The signals of the evaluation circuit are used for controlling a loss display and/or for the automatic setting of the speed of advance or of the operating parameters of the threshing and/or separation device and/or of the cleaning device.

Moreover, the combine harvester comprises a large number of moving parts, which can be damaged themselves, or whose bearings can be damaged, due to material defects, wear or excessive utilization. It has been proposed to detect by means of an oscillation sensor possible errors of moving parts of the harvesting machine on the basis of the vibrations caused by the defects (DE 101 00 522 A1).

In EP 1 839 478 A1, an impact sound sensor unit is described whose preliminary processing electronics can be reprogrammed for various tasks, including for use as a grain loss sensor, as a vibration sensor for monitoring the play of a bearing, or as an imbalance warning device. The impact sound sensor unit can, however, be programmed only for one application purpose at this time. In order to be able to simultaneously monitor lost grain and bearing damage, two impact sound sensor units are therefore required.

DE 10 2009 000 351 A1 describes a vibration sensor unit in whose housing a vibration sensor and a digital signal processing unit for damage monitoring as well as an analog signal processing unit for detecting impingement of a foreign body against a feed roll are incorporated.

It would be beneficial to reduce the expense required for detecting lost grains and for monitoring the moving parts of a combine harvester. It is an object of this invention to do this.

In accordance with one aspect of the invention a vibration sensor unit comprises a vibration sensor and an electronic processing circuit, which is connected in a signal transmitting manner to the vibration sensor. During operation, the signal processing circuit delivers information derived from the signals of the vibration sensor regarding the quantity of lost grains detected by the vibration sensor (particularly per unit of time). The signal processing unit outputs this result as a first initial value for further processing and/or display. At the same time the signal processing circuit examines the signals of the vibration sensor for vibrations, which may indicate potential damage to moving parts, and it delivers the result as a second initial value for further processing and/or display. In the analysis of the signals of the vibration sensor for the determination of the losses and of the machine diagnosis, one can use any desired evaluation method.

In this manner, a single vibration sensor unit simultaneously accomplishes two tasks, namely the determination of the number of lost grains per unit of time and the analysis of detected vibrations for possible signs of damage to moving parts. As a result, the expense for the steering and control of the combine harvester is decreased.

The vibration sensor and the signal processing circuit are arranged advantageously in a common housing. However, the possibility of arrangement of the vibration sensor spatially separately from the signal processing circuit also exists.

The vibration sensor is connected in particular in a vibration conducting manner to an impact plate or to an impact rod, which can be inserted in a crop flow that contains lost grains. The vibration sensor is coupled advantageously via a holder in a vibration-conducting manner to moving parts to be monitored.

BRIEF DESCRIPTION OF THE DRAWINGS

FIG. 2 is a circuit diagram of the vibration sensor unit.

DETAILED DESCRIPTION OF THE PREFERRED EMBODIMENTS

Figure 1:
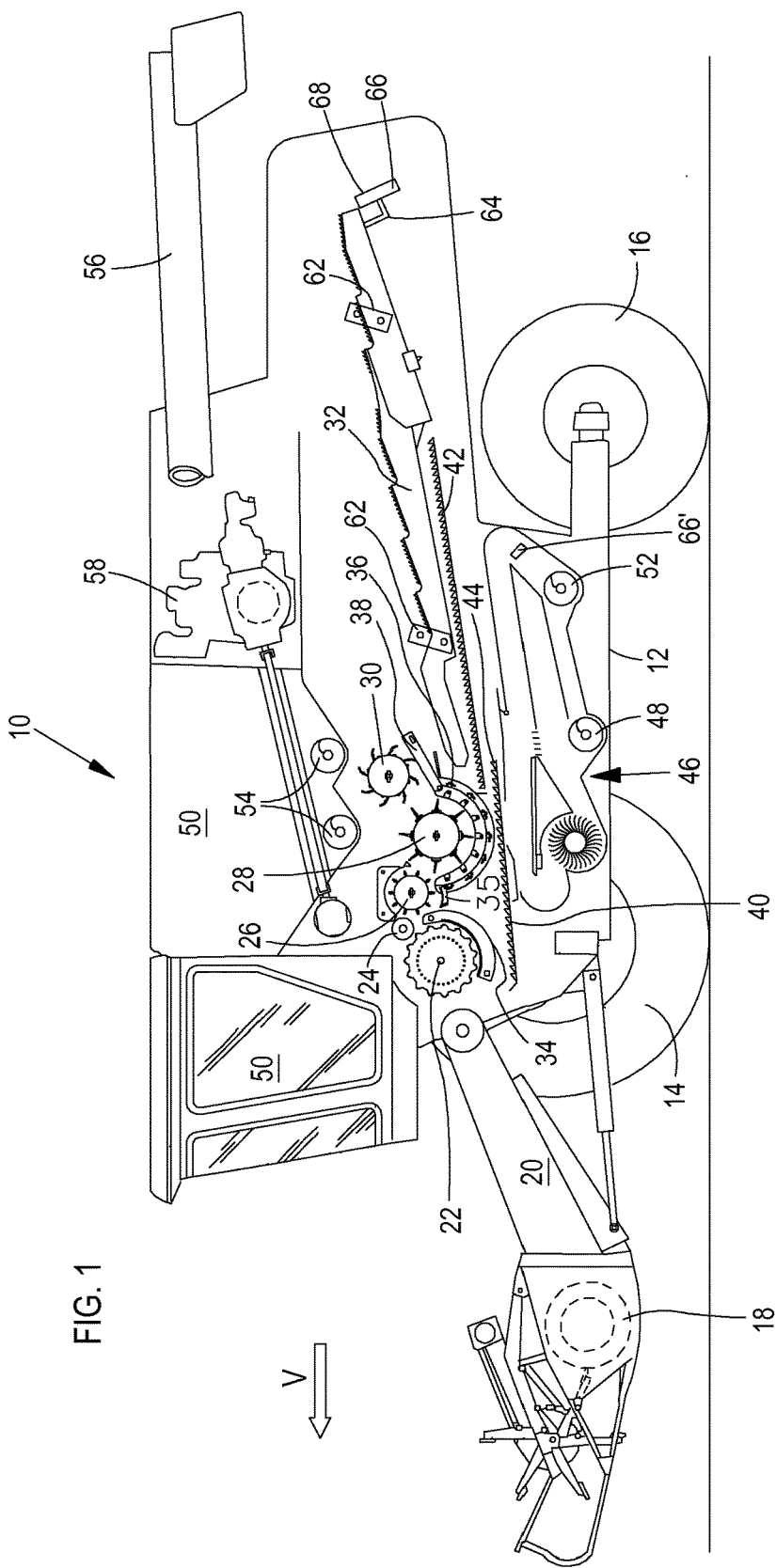
FIG. 1 is a diagrammatic side view of a combine harvester with a vibration sensor unit.

FIG. 1 shows a self-propelled combine harvester 10 with a frame 12, which is supported via front wheels 14 that are driven and move the vehicle over the ground and steerable rear wheels 16.

The front wheels 14 are set in a rotating motion by means of drive means (not shown), in order to move the combine harvester 10, for example, over a field to be harvested. Hereinbelow, the direction indications, such as "front" and "rear", relate to the travel direction "V" of the combine harvester 10 during a harvesting operation.

At the front end area of the combine harvester 10, a harvested material recovery device 18 in the form of a cutting machine is connected in a detachable manner in order to harvest, during the harvesting operation, the harvested material in the form of grains and other threshable cereals from the field, and to feed it upward and rearward through an inclined conveyor 20 to a multiple drum threshing machine, which comprises—one after the other in the travel direction V—a threshing drum 22, a stripping drum 24, a conveyance drum 26 of the overshot type, a tangential separator 28 as well as a deflection drum 30. One or more straw walkers 32 is located downstream of the deflection drum 30. The threshing drum 22 is surrounded in its lower and rearward area by a threshing basket 34. Beneath the conveyance drum 26, a cover 35 is provided, which is provided with openings or which is closed, while above the conveyance drum 26, a fixed cover is located, and above the tangential separator 28, a separating basket 36 with adjustable finger elements is located. A comb rake 38 is arranged under the deflection drum 30.

Beneath the multiple drum threshing machine, a front conveyor bottom 40 is located, which during operation, performs a pivoting movement directed alternately forward and rearward. A rear conveyance bottom 42 is arranged beneath the straw walkers 32, and during operation, it also performs a pivoting movement directed alternately rearward and forward. The front conveyance bottom 40 transports the mixture of grain and chaff that passes through the threshing basket 34 and through the separating basket 36 downward toward the rear, while the rear conveyance bottom 42 moves the mixture of grain chaff flowing through the straw walkers 32 toward the front. The rear conveyor bottom 42 transfers its mixture at its front end to the front conveyor bottom 40, which transfers it downward through a rearward comb rake 44. The mixture discharged by the front conveyance bottom 40 then enters a cleaning device 46 shown in greater detail in FIG. 2.

The grain that has been cleaned by the cleaning device 46 is conveyed by means of a grain auger 48 to an elevator (not shown), which conveys it to a grain tank 50. A returns auger 52 returns incompletely threshed ear portions through an additional elevator (not shown) back to the threshing process. On the rear side of the sieve device, the chaff can be thrown out through a rotating chaff distributor, or it is discharged through a straw chopper (not included in the drawing) arranged downstream of the straw walkers 32. The cleaned grain from the grain tank 50 can be discharged by an unloading system with transverse augers 54 and an unloading conveyor 56.

The mentioned systems are driven by a combustion engine 58 and they are controlled and steered by an operator from a driver cabin 60. The various devices for threshing, conveying, cleaning and separating are located within the frame 12. An outer sheath is located outside the frame 12. The outer sheath can be flipped up for the most part. The straw walkers 32 are supported by driven crankshafts 62 on the frame 12.

The multiple drum threshing machine represented here is just one embodiment of the invention. The multiple drum arrangement could be replaced by a single transversely arranged threshing drum and a downstream separation device with one or more straw walkers or with one or more separating rotors. However, it is also conceivable to use a rotating axial separator, which comprises a threshing section and a separating section. It is possible to use a single axial separator, or two (or more) adjacently arranged axial separators.

On the rear side of the rearward end of one of the straw walkers 32, a holder 64 is attached, which holds a vibration sensor unit 66. The vibration sensor unit 66 comprises a rearward impact plate 68, which is inclined at a slant upward, and along which flows straw that has been discharged by the straw walkers 32, which to a certain extent also contains lost grains. Lost grains impacting the impact plate 68 cause mechanical vibrations, which are detected and evaluated by the vibration sensor unit 66. In addition, mechanical vibrations of moving parts of the combine harvester 10 are transferred, for example, by the combustion engine 58, by the crankshafts 62, and by the multiple drum threshing machine via the straw walkers 32 to the vibration sensor unit 66, and evaluated by the latter for possible damage. A potential second attachment place for the (or a second) vibration sensor unit 66' is located at the rearward end of the upper sieve of the cleaning device 46.

FIG. 2 shows an electronic diagram of the vibration sensor unit 66. Within the housing 70, an impact plate 68 is attached, on whose inner surface a vibration sensor 72 is attached. The vibration sensor 72 here is represented as a capacitive vibration sensor; however, it could also work on the basis of a piezoelectric, inductive, optical or any desired other principle of operation. A plate of the vibration sensor 72 is connected via a coupling circuit to a resistor 74 with a voltage source and via a capacitor 76 to the input of an amplifier 78, while the other plate of the vibration sensor 72 applied to the impact plate 68 is grounded. The represented capacitive vibration sensor 72 can be produced particularly as a MEMS element; see the disclosure of 10 2011 007 843 A1.

The output of the amplifier 78 is connected to the input of a digital-to-analog converter 80 (A/D), whose output in turn is coupled to the input of a digital electronic signal processor 82 (DSP) used as a signal processing circuit to process the output of the digital-to-analog converter 80.

The digital signal processor 82 has a first output 84, which is connected via a loss display and/or automatic regulation 86 for the specification of the speed of advance of the combine harvester 10 and/or for the automatic setting of operating parameters of the multiple drum threshing machine, for example, the rpm and the threshing and/or separation gap.

In addition, the digital signal processor 82 has a second output 88, which is connected to a damage monitoring device 90. The first output 84 and the second output 88 do not have to be separated electrically from each other; instead they can be implemented by a jointly used, serial or parallel interface. In this case, at the interface, the first output 84 and the second output 88 are combined and they can be distinguished by the protocol used by the interface.

During operation, the digital signal processor analyzes the vibrations detected by the vibration sensor 72 for vibration components originating from lost grains. For this purpose, one can perform, in particular, a Fourier analysis of the signals of the vibration sensor 72, and in the case where a frequency component characteristic for an impacting lost grain is contained in the spectrum, a corresponding signal (pulse) is delivered to the first output 84. It is also possible to detect the quantity or number of vibrations per unit of time (for example, per second) that result from grains, and to apply that to the first output 84.

The spectrum is further analyzed for vibrations resulting from a potentially defective component of the combine harvester 10. For this purpose, reference is made to the disclosure of DE 101 005 22 A1, which is included by reference in the present documentation. Thus, the straw walkers 32 move at a characteristic frequency, which is on the order of several Hz. If the amplitude of this oscillation is higher than usual, a loose portion of the straw walkers may be present, or there may be a defect in a bearing of the crankshafts 62. In this case, a corresponding output is transmitted to the second output 88.

The aforementioned analyses of the spectrum with regard to detected lost grains (first output 84) and defective components (second output 88) may occur nearly simultaneously, because the digital signal processor 82 in fact processes these processes sequentially, but in a very short period of time. Another digital signal processor 82 may be provided in parallel to the existing digital signal processor 82, with each of the two digital signal processors 82 performing one of the aforementioned analyses. In this embodiment, the aforementioned analyses can be performed in parallel.

The invention claimed is:

1. A vibration sensor unit with a vibration sensor and with an electronic signal processing circuit that is connected in a signal transmitting manner to the vibration sensor, and that is configured to derive information from signals of the vibration sensor regarding a quantity of lost grains detected by the vibration sensor, and deliver the information as a first initial value for further processing and/or display, characterized in that the electronic signal processing circuit is configured in order to examine the signals of the vibration sensor additionally for vibrations that are signs of possible damage to moving parts to derive information from the signals of the vibration sensor regarding damage to the moving parts, and to deliver a result indicating the possible damage to the moving parts based upon the signals as a second initial value for further processing and/or display, wherein the vibration sensor is connected in a vibration conducting manner to an impact plate or to an impact rod, which can be inserted in a crop flow containing lost grains.

2. A vibration sensor unit with a vibration sensor and with an electronic signal processing circuit that is connected in a signal transmitting manner to the vibration sensor, and that is configured to derive information from signals of the vibration sensor regarding a quantity of lost grains detected by the vibration sensor, and deliver the information as a first initial value for further processing and/or display, characterized in that the electronic signal processing circuit is configured in order to examine the signals of the vibration sensor additionally for vibrations that are signs of possible damage to moving parts, and to deliver a result as a second initial value for further processing and/or display, wherein the vibration sensor is coupled via a holder in a vibration conducting manner to the moving parts to be monitored.

3. The vibration sensor unit according to claim 2, wherein the electronic signal processing circuit contains a digital signal processor, which respectively generates the first initial value and the second initial value either at the same time or sequentially one after the other.

4. A combine harvester with the vibration sensor unit according to claim 2.

5. The combine harvester according to claim 4, wherein the combine harvester comprises an upper sieve and wherein the vibration sensor is located rearward of the upper sieve.

6. The combine harvester according to claim 4 further comprising a damage monitoring device to receive an output of the vibration sensor unit.

7. The vibration sensor unit according to claim 2, wherein the vibration sensor and the electronic signal processing circuit are arranged in a common housing.

8. The vibration sensor unit according to claim 2, wherein the vibration sensor is connected in a vibration conducting manner to an impact plate or to an impact rod, which can be inserted in a crop flow containing lost grains.

9. The vibration sensor unit according to claim 8, wherein the vibration sensor comprises a first portion applied to the impact plate or to the impact rod and a second portion coupled to an amplifier.

10. The vibration sensor unit according to claim 8, wherein the impact plate has a front face to be contacted by lost grain and wherein the vibration sensor is connected to a rear face of the impact plate.

11. The vibration sensor unit according to claim 1, wherein the electronic signal processing circuit contains a digital signal processor, which respectively generates the first initial value and the second initial value either at the same time or sequentially one after the other.

12. A combine harvester with the vibration sensor unit according to claim 1.

13. The combine harvester according to claim 12 further comprising a damage monitoring device to receive an output of the vibration sensor unit.

14. The vibration sensor unit according to claim 2, wherein the vibration sensor comprises a first portion applied to an impact plate or to an impact rod and a second portion coupled to an amplifier.

15. The vibration sensor unit according to claim 14, wherein the impact plate has a front face to be contacted by lost grain and wherein the vibration sensor is connected to a rear face of the impact plate.

16. A harvester comprising:
moving parts comprising a sieve;
an impact plate supported rearwardly of the sieve;
a vibration sensor connected to the impact plate and operably coupled to the moving parts to vibrate in response to vibration of the moving parts; the vibration sensor to output signals indicative of grain loss and indicative of damage to the moving parts of the harvester; and
signal processing circuitry to output a result regarding the damage to the moving parts of the harvester based upon the signals from the vibration sensor.

17. The harvester of claim 16 further comprising a damage monitoring device to receive signals output by the vibration sensor.

18. The vibration sensor unit according to claim 1, wherein the signal processing circuit is configured to carry out two separate and different analysis of the signals, a first analysis of the signals for identifying grain loss and a second analysis of the signals for identifying the damage to the moving parts.

19. The vibration sensor unit according to claim 2, wherein the signal processing circuitry is configured to carry out two separate and different analysis of the signals, a first analysis of the signals for identifying grain loss and a second analysis of the signals for identifying the damage to the moving parts.

20. The harvester of claim 16, wherein the signal processing circuit is configured to carry out two separate and different analysis of the signals, a first analysis of the signals for identifying grain loss and a second analysis of the signals for identifying the damage to the moving parts.

* * * * *